United States Patent [19]

Anderson

[11] Patent Number: 5,669,745
[45] Date of Patent: Sep. 23, 1997

[54] BUMPER SYSTEM FOR AN INTERMODAL AUTO TRAILER

[75] Inventor: John D. Anderson, Aurora, Ill.

[73] Assignee: Zeftek, Inc., Montgomery, Ill.

[21] Appl. No.: 521,528

[22] Filed: Aug. 30, 1995

[51] Int. Cl.⁶ ............... B60P 7/16; B61D 45/00
[52] U.S. Cl. ............... 410/87; 410/18; 410/26; 410/117
[58] Field of Search ............... 410/4, 15, 18, 410/26, 87, 88, 117, 155; 293/128; 105/374; 267/139, 140; 49/462; 248/548

[56] References Cited

U.S. PATENT DOCUMENTS

| | | | |
|---|---|---|---|
| 1,394,038 | 10/1921 | Marinier et al. | 410/18 |
| 5,032,044 | 7/1991 | Dorst | 410/18 X |
| 5,239,933 | 8/1993 | Murphy et al. | 410/117 X |
| 5,320,392 | 6/1994 | Hart | 293/128 |
| 5,375,534 | 12/1994 | Adams | 410/89 X |
| 5,527,139 | 6/1996 | Bruder et al. | 410/117 |
| 5,579,697 | 12/1996 | Burke | 105/374 X |

OTHER PUBLICATIONS

Vantuono, William C., "Roadrailer Hits the Big Time", pp. 49, 50 & 52, Railway Age; Oct., 1994.

*Primary Examiner*—Karen B. Merritt
*Assistant Examiner*—Stephen Gordon
*Attorney, Agent, or Firm*—Lloyd L. Zickert; Adam H. Masia

[57] ABSTRACT

A bumper system for a movable deck in an intermodal auto carrier or trailer wherein the bumper system is mounted on the deck and is foldable against the deck or opened to a position for protecting the auto doors against damage when opening the doors for ingress and egress of a driver during loading and unloading operations.

26 Claims, 6 Drawing Sheets

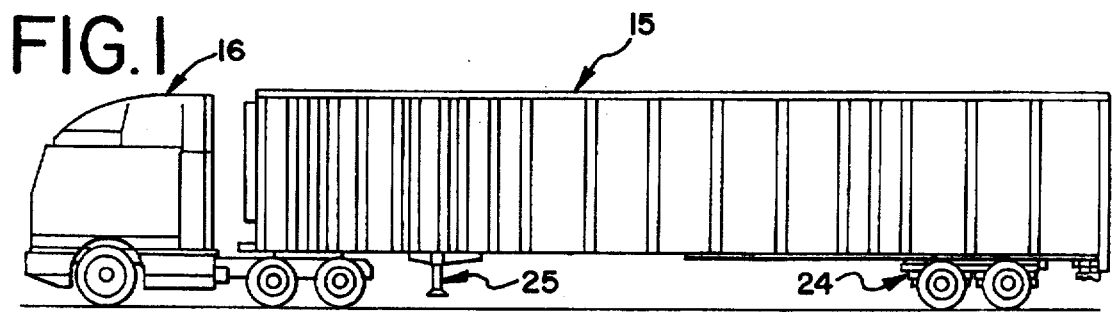
FIG. 1
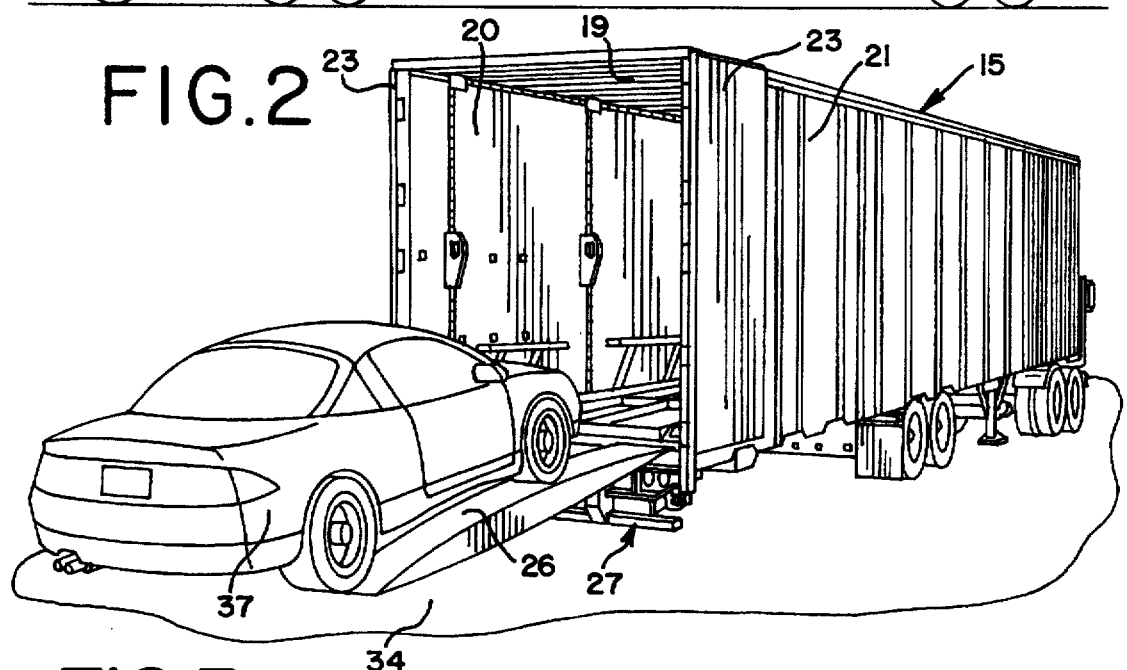
FIG. 2
FIG. 3
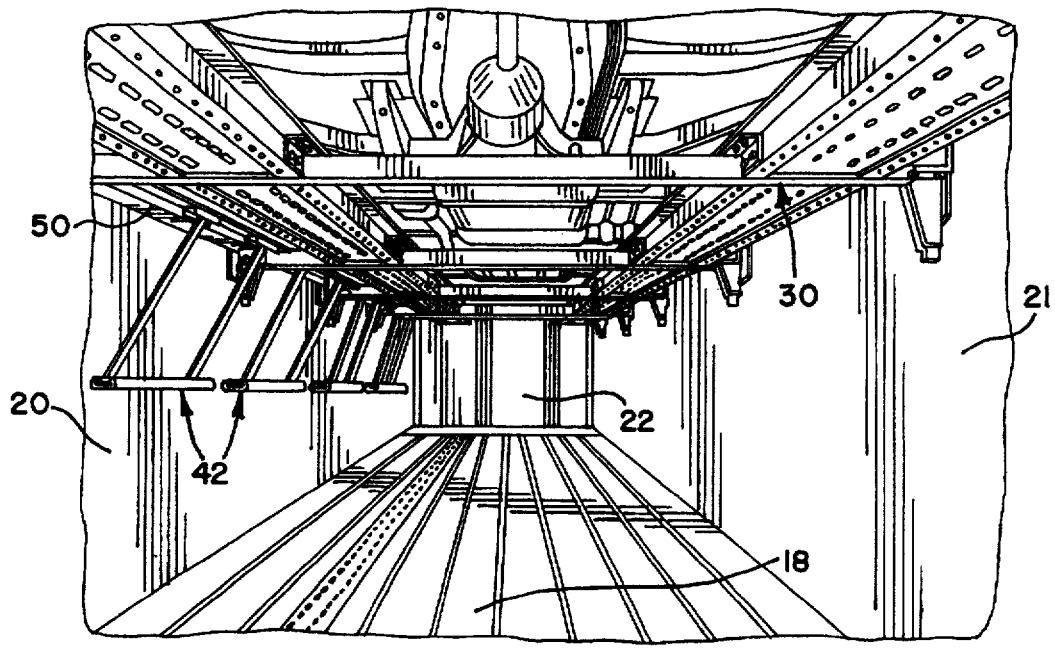

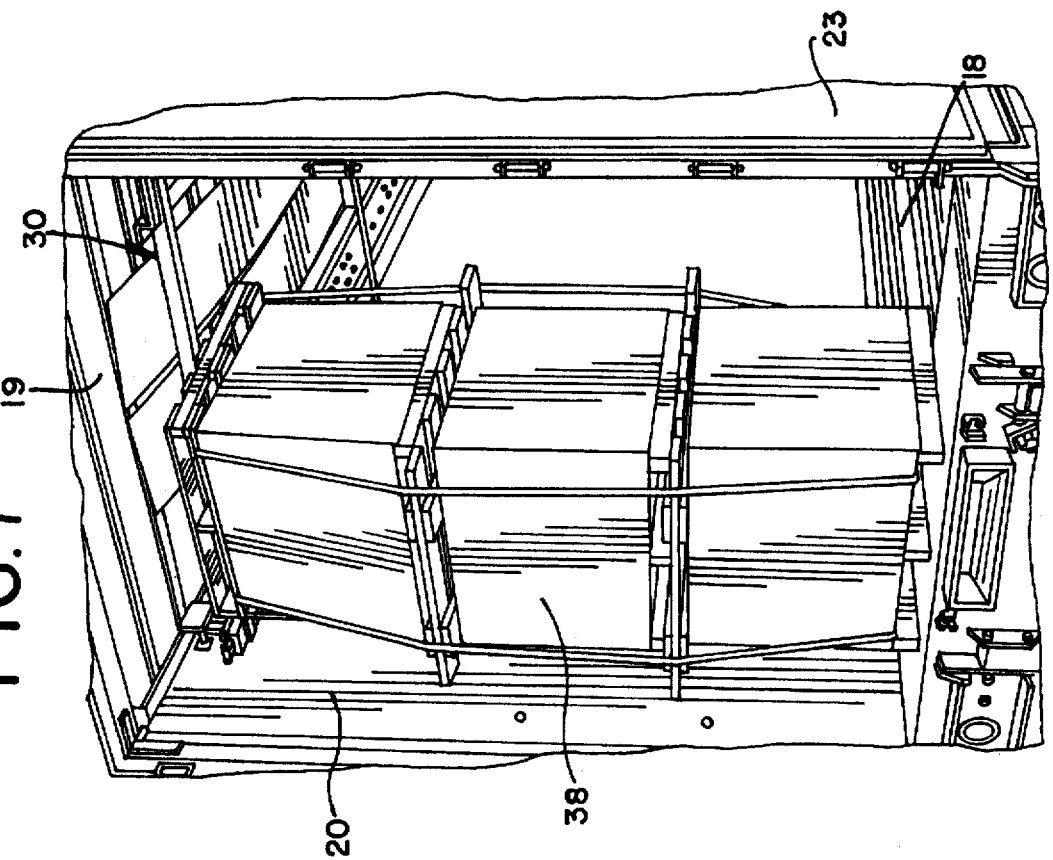
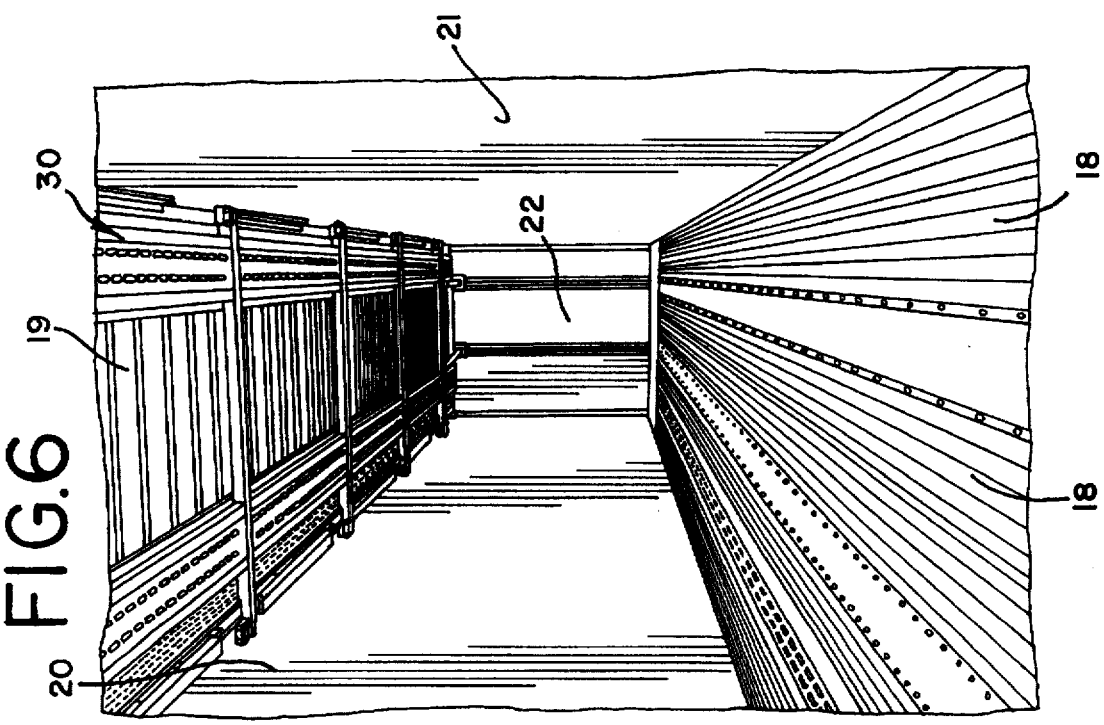

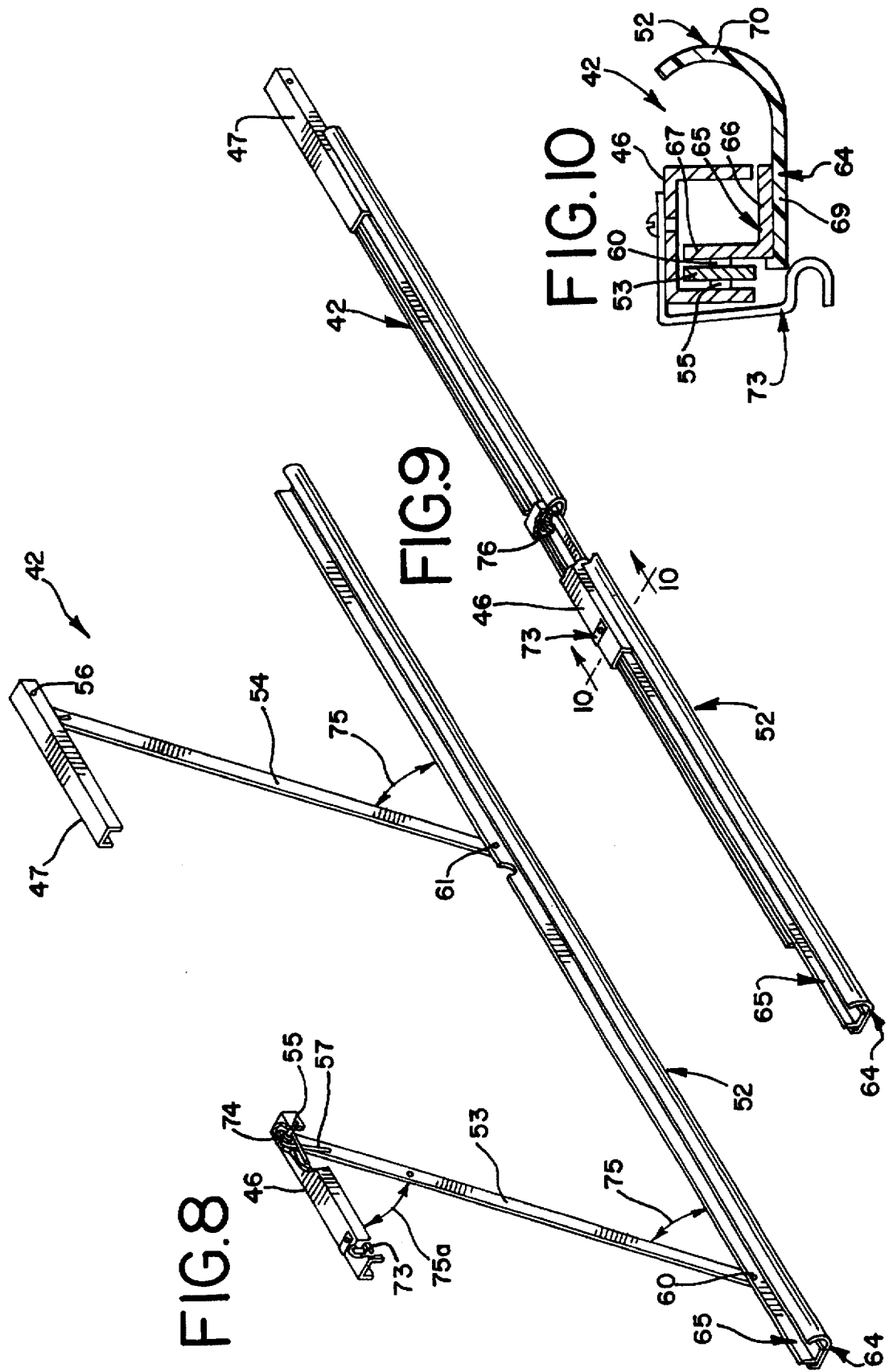

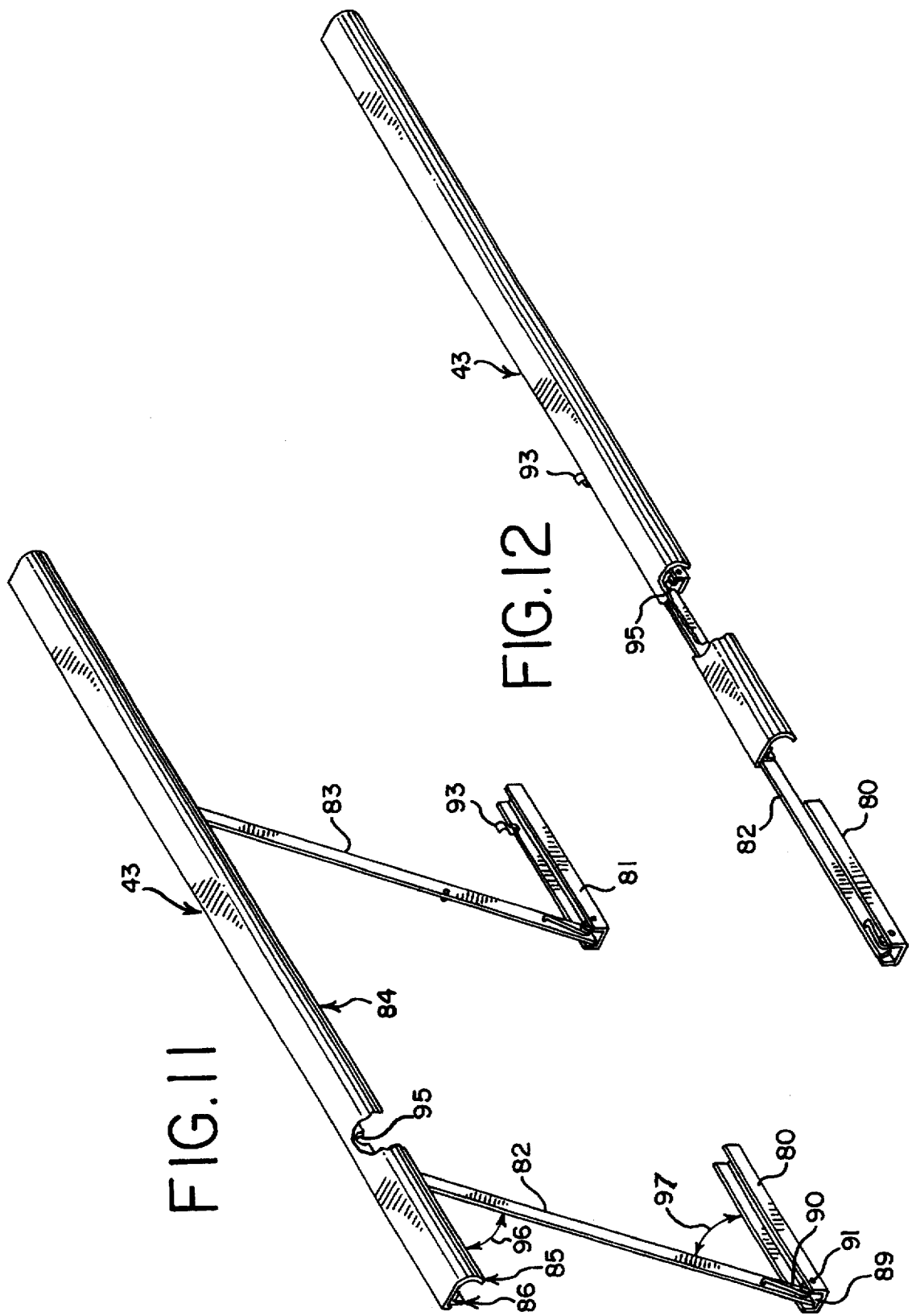

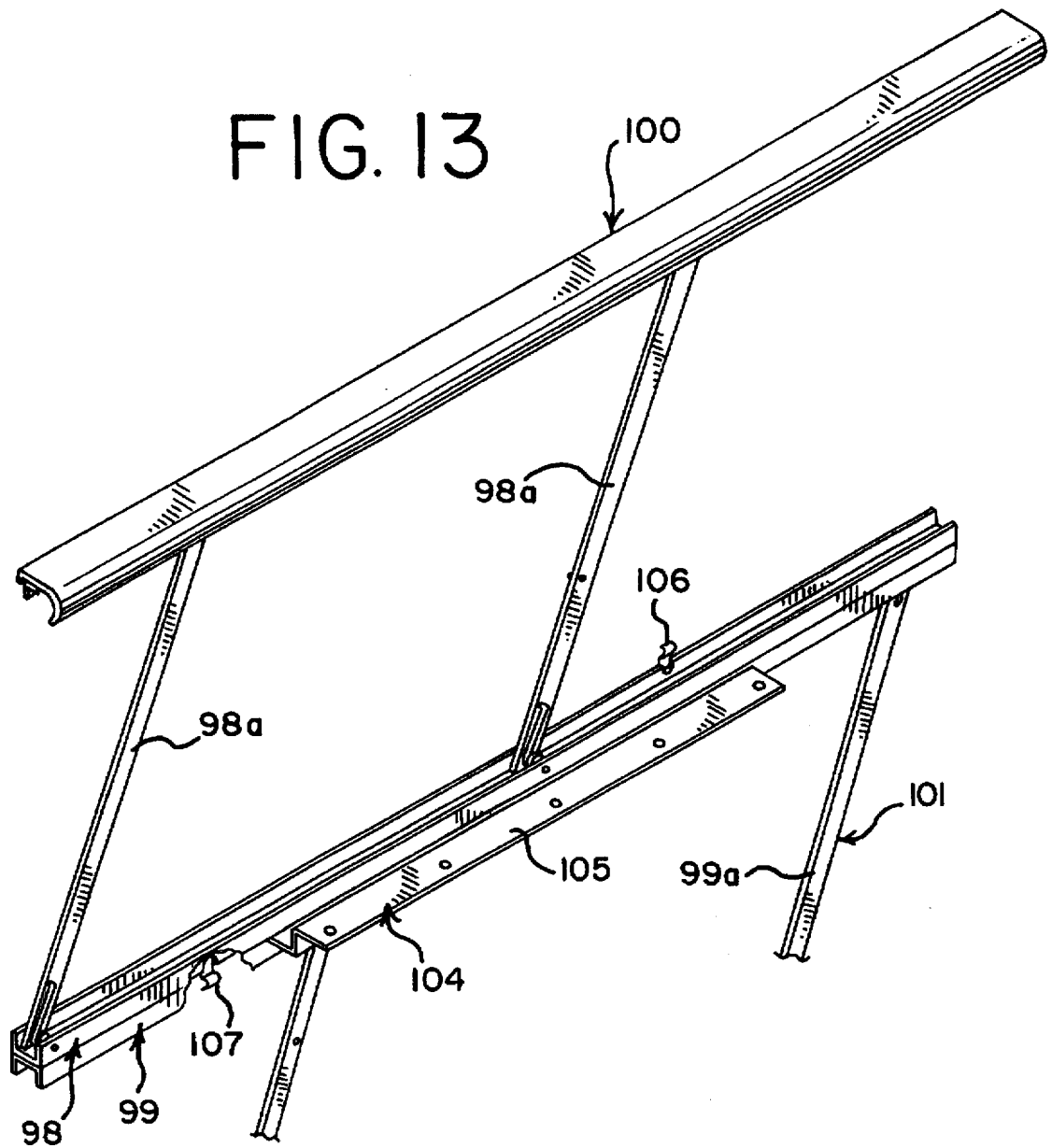

BUMPER SYSTEM FOR AN INTERMODAL AUTO TRAILER

DESCRIPTION

This invention relates in general to a door bumper system for a trailer transporting vehicles and having a movable deck, and more particularly to a bumper system mountable on a movable deck in a trailer that coacts with the deck depending upon its position and is capable of moving between open and closed positions.

BACKGROUND OF THE INVENTION

Heretofore, it has been known to use an intermodal semi-trailer for transporting vehicles such as automobiles and trucks between a site of manufacture and a railroad car onto which it may be loaded for long-distance hauling and ultimately between a railroad car destination and a final distribution point. The semi-trailer therefore is movable along the road with a conventional tractor and loadable on a flatcar or suitable bogie wheels after disconnecting the tractor so that it may be transported a long distance by rail to a designated destination. Following the unloading of the trailer from the flatcar, it is again connected to a tractor and hauled over the road to an ultimate distribution facility.

The semi-trailer includes a floor, a roof, upstanding opposed side walls, an upstanding end wall at one end and doors at the other end for loading and unloading vehicles into the trailer. A movable deck is provided within the trailer that is movable from any position between the floor and the ceiling. When the deck is at the floor level, a row of vehicles may be loaded onto the deck. Thereafter, the deck is moved up to an intermediate level to allow room for loading a row of automobiles onto the floor so that the trailer can accommodate two levels of vehicles in stacked relation. While it is understood that the vehicles may be automobiles or trucks, such as pickup trucks, or vans, for simplicity purposes, vehicles will be hereinafter usually referred to as automobiles.

This intermodal trailer, having a movable deck, is a dual-purpose vehicle inasmuch as it can transport automobiles in one direction by carrying cars on the deck at one level and on the floor at a lower level; and after unloading the cars, the deck can be raised to the roof and open substantially the entire area within the trailer for receiving other goods such as auto parts, for hauling in the other direction to the automobile factory. For example, one such intermodal vehicle includes a 117-inch interior height that can carry six full-size automobiles based upon an automobile size of 210 inches in length and 58 inches in height, wherein the automobiles are stacked with three on the deck and three on the floor. Following the unloading of the automobiles, the movable deck can be stored at the roof and give 110 inches of vertical clearance for loading of other freight. Thus, this intermodal trailer can carry automobiles directly from the factory to a dealer without exposing them to the elements and thereafter used for handling dry freight on a back-haul situation to the automobile factory.

While the vehicles are being transported and in a completely closed trailer so that they are out of the weather, some damage may occur to the vehicle doors during the loading and unloading process, wherein a driver must open a door on the driver's side in order to get in and out of the automobile. Opening of the door can cause contact of the door edges with a side wall of the trailer and damage the edges. Such damage usually produces costly repair bills or necessitates discounting the vehicle price. This problem is overcome by the present invention.

SUMMARY OF THE INVENTION

The present invention overcomes the problem heretofore encountered by preventing door damage that could occur during loading and unloading of the vehicles by virtue of the driver's door having to be opened to allow a driver to get in and out of the vehicle during loading and unloading operations. The present invention overcomes this problem by providing a bumper system that is mountable on the movable deck to provide bumpers above and below the deck for engagement by the doors of the automobiles when they are opened, thereby preventing damage to the doors. The bumper is in the form of a plastic member of a suitable plastic that is friendly with the doors and which avoids damage to the door edges when they are in contact with the bumper and also prevents the doors from contacting the side walls of the trailer.

The bumper system of the invention includes a bumper member mountable on extension arms that are pivoted at one end to the bumper member and at the other end to the movable deck, whereby the bumper can be raised to an open position for preventing the automobile doors from engaging the side wall of the trailer or to a closed position when the deck is in a raised position against the roof or in a lowered position against the floor for loading automobiles onto the deck. Thus, the bumper on the extension arms is movable to an operative position for preventing door damage of the automobiles and to a closed and stored position depending upon the position of the movable deck when the trailer is used for hauling other types of freight. When the deck is moved all the way to the roof, the upper bumpers will be in closed and stored position and the lower bumpers will also be in closed and stored position to provide complete clearance between the floor and the upper position of the movable deck for loading of dry freight.

The mounting of the bumper system onto the movable deck is such that the upper bumper will automatically close when the movable deck is raised to the roof and the lower bumper will automatically close when it is moved all the way to the floor. Additionally, means is provided for maintaining the bumper system in closed and stored position on a selective basis.

It is therefore an object of the present invention to provide a bumper system for a movable deck of an intermodal trailer to prevent damage to vehicle doors that need to be opened for permitting a driver to get into and out of a vehicle.

It is a further object of the present invention to provide a bumper system for a movable deck in an intermodal trailer that is automatically closable upon the deck being moved to the roof or to the floor.

A further object of the present invention is to provide a bumper system for a movable deck in an intermodal trailer that may be selectively latched into stored position or maintained in open position to prevent damage of automobile doors when they are opened.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a side elevational view of an intermodal trailer or semi-trailer for automobiles that is connected to a tractor for transport along the road between a railroad yard and a factory site or an automobile dealer;

FIG. 2 is a perspective view of the intermodal trailer in its vehicle loading position to illustrate a vehicle such as an automobile being loaded into the trailer;

FIG. 3 is a fragmentary interior view of the intermodal trailer with the movable deck in an intermediate position and loaded with vehicles and the lower deck or floor prior to being loaded where the bumper system is lowered to open position so that vehicles loaded on the floor will avoid damage to the doors when they are opened;

FIG. 6 is a fragmentary interior view of the intermodal trailer with the movable deck raised to the roof and the bumper system in stored position to define an open compartment;

FIG. 7 is a perspective view of the rear end of the intermodal trailer wherein the movable deck is raised to the roof and illustrating the loading of dry freight;

FIG. 8 is a perspective view of a lower bumper system or unit before being mounted on the movable deck and illustrating the bumper in open or operative position;

FIG. 9 is the bumper system of FIG. 8 and illustrating the bumper in stored and closed position;

FIG. 10 is an enlarged transverse sectional view taken substantially along line 10—10 of FIG. 9;

FIG. 11 is a perspective view of an upper bumper system before being mounted on the movable deck and illustrating the bumper in open or operative position;

FIG. 12 is a view of the bumper system of FIG. 11 and illustrating the bumper in closed and stored position; and FIG. 13 is a perspective view of a modified bumper system wherein the channel rails or supports for supporting the extension arms on the movable deck are shown in back-to-back position so that a single unit of upper and lower bumpers may be installed on a movable deck of a trailer.

DESCRIPTION OF THE INVENTION

Figure 4:
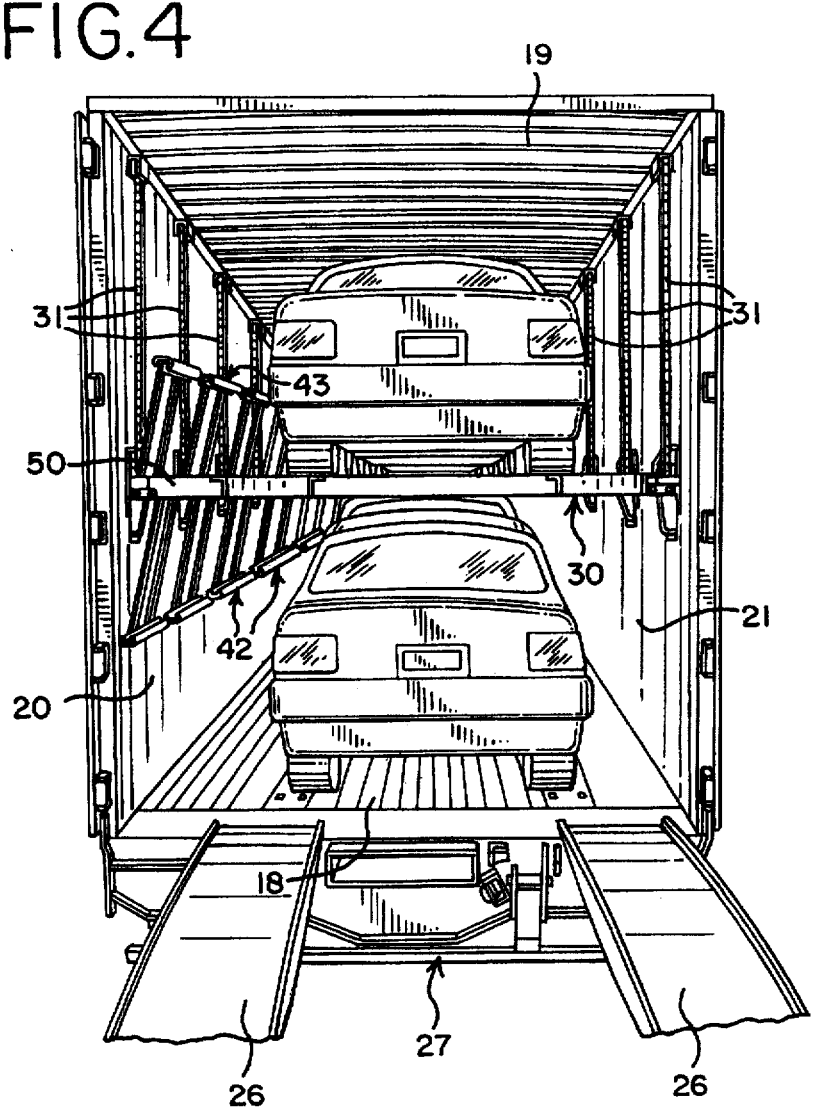
FIG. 4 is a rear elevational view of the trailer shown in FIGS. 1 and 2 with the doors open and with the movable deck at its intermediate position and automobiles loaded onto the movable deck and the floor.

Referring now to the drawings, and particularly to FIGS. 1 to 7, the tractor and semi-trailer or intermodal trailer are illustrated. As seen in FIG. 1, the semi-trailer or intermodal trailer, generally designated by the numeral 15, is illustrated as being hitched or coupled to the tractor 16 so that the trailer can be transported on the road between a manufacturing site and a railroad yard or later between a railway yard or distribution center to a vehicle dealer or user. While the intermodal trailer is not illustrated on a railroad car, it will be appreciated that it may be suitably mounted on a flatcar or rail bogies in a well known fashion for transporting the trailer long distances between one railroad yard and another.

The intermodal tractor 15 includes a floor 18, a roof 19, opposed side walls 20 and 21, an end wall 22 at one end of the trailer, and doors 23 at the other end. The doors are shown in open position in FIGS. 2, 4 and 7, and may be closed to completely close the end opposite end wall 22. It will be understood that a hitch receptacle is provided at the forward end of the trailer for mating with a hitch on the tractor 16. A set of wheels 24 is provided at the rear end for supporting the rear end of the trailer when it is hauled over the road. The set of wheels 24 is movable forward in order to facilitate the tilting of the trailer as particularly shown in FIGS. 2 and 5 during the loading and unloading of automobiles or other goods. Additionally, a stand 25 is provided near the front end of the trailer for purposes of supporting the front end of the trailer when it is unhitched from the tractor hitch and tilted for purposes of facilitating the loading and unloading of automobiles. Further, ramps 26 are provided to be temporarily mounted at the open end of the trailer during loading and unloading of automobiles or other products. The ramps provide runways for the wheels of the automobiles, as illustrated in FIG. 2. Also, it will be appreciated that a stand is provided at the very rear end of the trailer, as generally indicated by the numeral 27, for purposes of supporting the rear end of the trailer during loading and unloading of automobiles.

Figure 5:
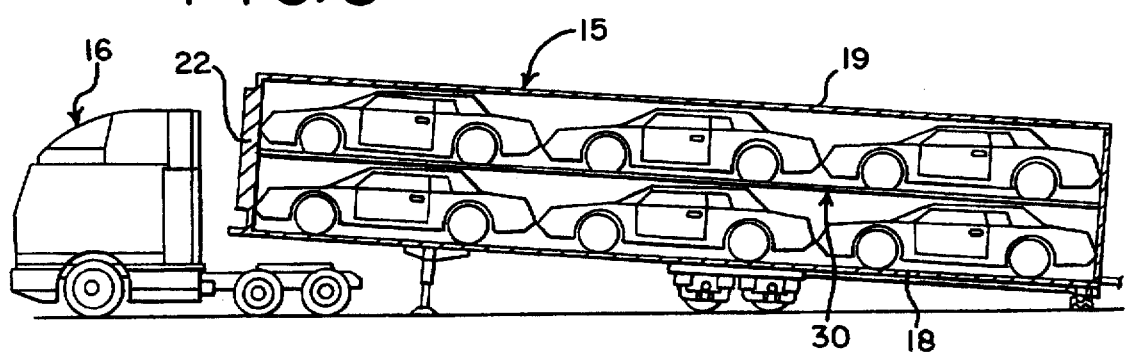
FIG. 5 is a schematic view similar to FIG. 1 but illustrating the trailer in tipped or tilted position for loading and unloading of vehicles and the manner in which the three vehicles are essentially stacked on top of one another by virtue of the movable deck and the trailer floor.

A movable deck 30 is suitably mounted within the trailer. The deck 30 is movable to any desired position between the floor and roof. While not shown, a system of cables and chains is provided for raising and lowering the deck to its selected position. At a predetermined intermediate position, as shown in FIGS. 3 to 5, the deck is positioned to maintain a row of automobiles at an intermediate position so that another row of automobiles may be received on the floor underneath the deck. As seen particularly in FIG. 4, a plurality of chains or cables 31 is provided at each side of the movable deck and trained over movable pulleys or sprockets at the roof and interconnected into a hoist system that is not completely shown for changing the level of the deck as desired. It will be understood that the trailer with the movable deck arrangement does not constitute a part of the invention, and that the invention is only in the bumper system used on the movable deck for protecting the doors of an automobile against damage when the doors are opened for permitting someone to get in or out of an automobile.

The intermodal trailer 15 is in the loading and unloading mode, as shown particularly in FIG. 2, for the loading and unloading of automobiles wherein the rear end of the trailer is tilted downwardly to rest on the stand 27, and the ramps 26 are in place to allow the automobiles to be driven from the road surface 34 onto the ramps and into the trailer. In this mode, the deck 30 is in its lowermost position resting on the floor of the trailer. Following the loading of a row of three or more vehicles onto the deck while it is in its lowermost position, the deck is then elevated and raised to the position shown in FIG. 3. With respect to the bumper system, it will be explained hereafter as to how the bumpers are to be used during the loading and unloading of the automobiles. With the movable deck in the intermediate position supporting the automobiles at the upper end of the trailer, the floor is then opened so that additional vehicles can be driven onto the ramp and into the trailer and onto the floor until the chosen complement of vehicles is loaded onto the floor, as particularly illustrated in FIGS. 4 and 5. Thereafter, the ramps can be removed, and the doors can be closed. It will be understood that the vehicles will be suitably tied down or locked in place on the movable deck as well as the floor so that they do not shift positions during transport of the trailer across the roadways.

After the trailer has been used to transport automobiles to a dealer from a railroad yard, the movable deck may then be moved to the roof of the trailer as illustrated in FIG. 6, so that dry freight may be loaded into the trailer, as illustrated in FIG. 7, wherein freight 38 is shown where it can be placed on the floor of the trailer and extend upwardly toward the roof just below the deck 30. In this instance, triple boxes of goods may be tied together, as illustrated by the freight 38. Thus, after the automobiles 37 have been removed from the trailer, the trailer may then be used to transport dry freight, such as automobile parts, back to the factory via the rails once the intermodal trailer is driven over the roadway to the rail yards.

As previously explained, the bumper system of the invention is mounted on the movable deck of a trailer. A bumper system is mounted on the upper side of the deck for handling automobiles that are stored on the deck during transit, and a bumper system is mounted on the underside of the deck for automobiles that are received on the floor of the trailer. As particularly seen in FIGS. 2, 3 and 4, a plurality of bumper systems or units 42 is mounted on the upper side of the deck for automobiles that are carried on the deck, and a plurality of bumper systems or units is also mounted on the underside of the deck to extend downwardly for protecting the doors of automobiles carried on the floor of the trailer. The upper and lower bumper units are essentially the same except for being formed for use either on the upper or lower side of the movable deck.

As seen in FIGS. 3 and 4, a plurality of the lower bumper systems 42 are mounted on the underside of the movable deck 30. It will be appreciated that any number of units may be employed in order to provide bumpers for each of the automobiles that are carried, so that the doors to be opened in the automobiles during loading and unloading will contact a bumper rather than the side walls of the trailer.

Each lower bumper unit 42 includes a pair of C-shaped channel members 46 and 47 which are suitably attached to the underside of the movable deck 30 and preferably along the walkway 50 of the deck. The walkway provides an area for the drivers to walk along when they load and unload the automobiles from the trailer and for securing the automobiles against shifting positions during transit. Walkways are provided on both sides of the deck in order to permit the appropriate tie-down or chocking of the automobiles to the deck. Thus, the C-shaped channel members 46 and 47 have the open part of the channel facing downwardly as particularly seen in FIG. 8 to facilitate the compact folding or nesting of the bumper unit when it is in closed position, as shown in FIG. 9.

The bumper unit 42 includes a bumper 52 that is supported from the C-shaped rails 46 and 47 by extension arms 53 and 54. The extension arms 53 and 54 are pivoted or hinged at their upper ends on pins 55 and 56 carried by the C-shaped channels 46 and 47. Also associated with each pivotal mounting of the upper end of the extension arms is a torsion spring 57 that acts to continually bias the bumper 52 to a predetermined open position when it is extended from the channel-shaped members 46 and 47. Each torsion spring includes an anchoring leg bearing against the base of the C-shaped channel member, coils connected to the anchoring leg and received on the pin or shaft of the pivotal connection or hinge, and a force arm connected to the extension arm. Any other suitable spring means may be provided to maintain the bumper in open position. The lower ends of the extension arms are pivotally connected or hinged to the bumper at 60 and 61, respectively.

As seen particularly in FIGS. 8, 9 and 10, the bumper 52 includes a plastic rail 64 suitably secured to a metal stiffening member 65 in the form of an angle bar having a horizontal leg 66 and a vertical leg 67, as seen particularly in FIG. 10. The extension arms 53 and 54 are pivotally connected to the vertical leg 67, as particularly seen in FIG. 10. The cross-sectional shape of the plastic bumper member 64 is shaped in cross section like a cane wherein it includes a straight, flat portion 69 that lays against the horizontal leg 66 of the angle bar 65 and a curvate arm or end 70 extending substantially perpendicular to the portion 69, and against which the car doors will engage. Thus, the end portion 70 is somewhat resilient in view of its attachment to the stiffening angle bar 65, and because it is in spaced relation from the angle bar. This causes the bumper member 64 to be soft to the car doors. In open position the curved end 70 extends substantially vertically and presents to the automobile doors a face against which the doors can engage without damaging the doors.

The lower bumper unit, as shown in FIGS. 8 to 10, is shown in extended or open position in FIG. 8 and in closed or stored position in FIGS. 9 and 10 wherein the vertical leg of the angle bar 65 together with the extension arms 53 and 54 nest within the C-shaped channels 46 and 47 to provide a compact fit that takes up a minimum of space. Additionally, when in a closed position, a spring clip or latch 73 engages the bumper to selectively hold the bumper in closed position. While only one spring clip 73 is shown and mounted on the C-shaped rail 46, it should be appreciated that another could be provided on the C-shaped channel 47 if desired. Further, the upper ends of the extension arms 53 and 54 are formed with an angle face 74 which mates with the base of the C-shaped channel when in open position and forms a stop to prevent the bumper from opening any further. Thus, the bumper in open position thereby positions the extension arms such that there is an acute angle formed between the extension arms and the bumper, as indicated at 75, and a similar opposing angle 75a between the arms and the channel members which coacts with the bumper and extension arms such that when the deck is lowered to the floor, the bumpers when engaging the floor can close automatically by swinging on the extension arms and moving to closed position. This automatic feature is important inasmuch as the workers dealing with the extension arms may have overlooked the closing of the bumpers prior to the lowering of the deck to the floor. Accordingly, this feature prevents damage to the bumper unit when it is lowered and not previously placed in stored position. A preferred angle 75 between the extension arms and the bumper is about 65 degrees, although it can be appreciated that any suitable angle may be provided.

The lower bumper units will be in open position as shown particularly in FIGS. 3 and 4 during the loading of automobiles on the floor so that when the driver opens the door of the automobile, it will engage the bumper and prevent damage to the door. When not needed for automobiles, the bumper units will be in closed position. Because the extension arms and bumpers fold into or nest with the channel members, a notch 76 is provided in the angle bar 65 to accommodate the pivot connection 55 to permit a more complete nesting relation.

The upper bumper units 43 are essentially the mirror image of the lower bumper units in that they likewise include a pair of C-shaped channel members 80 and 81 having extension arms 82 and 83 pivotally connected at one end to the channel members and pivotally connected at the other ends to a bumper 84 which is comprised of a plastic member 85 and a metal angle bar 86 serving as a backing plate for the plastic member 85 to stiffen the plastic member along its length and also to provide a member to which the upper ends of the extension arms 82 and 83 are pivotally connected. Similarly to the bumper unit 42, the ends of the extension arms pivoted to the C-shaped channel members 80 and 81 are cut at an angle to provide a stop 89 when the arms are pivoted up to a predetermined position. Also similarly, a torsion spring 90 is provided at each pivot connection which includes the pivot pin 91 for purposes of applying a torsional force to the arms and maintaining them in the upward position as illustrated in FIG. 11. Thus, the torsion springs on each of the extension arms 82 and 83 maintain the bumper in open position when it is not latched in closed position. As previously stated, the open position is a predetermined position for the bumper to be engaged by a door opened by a driver when the driver is either getting into or out of the car. Also similarly to the lower bumper unit 42, a spring clip 93 is provided on the C-shaped channel 81 to latch over the bumper and selectively maintain the bumper in closed position, as shown in FIG. 12. Further, like the lower bumper unit, the bumper 84 and the extension arms will nest with the C-shaped channel members 80 and 81 when the bumper is in closed position, as shown in FIG. 12. A notch 95 is formed in the backing plate or angle bar 86 to accommodate the pivot connection or hinge between the extension arm 83 and the channel member 81 when the bumper is in closed and stored position. Again, the angle between the extension members and the channel-shaped member, as well as the angle between the extension arms and the bumper as indicated by 97 and 96, is an acute angle of approximately 65 degrees so that the predetermined position of the bumper when in open position is such that it will close automatically if not closed manually when the movable deck is lowered to the floor or raised to the roof and the respective bumper during positioning of the deck contacts either the floor or the roof.

It may be appreciated that when the bumper is in closed position and latched by the spring clip 93, the spring tension on the clip may be easily overcome upon applying an upward force to the bumper to overcome the bias of the spring clip so that the bumper can be opened to its operative position. After freeing the bumper from the spring clip, the bumper will open automatically under the force of the torsion springs to a predetermined position as set by the stop on the ends of the extension arms when they engage the base of the C-shaped channel members. The lower bumper unit 42 operates in the same way with respect to opening.

It will be appreciated that the plastic member of the bumper is of a suitable plastic that will withstand low temperature impact forces. For example, suitable plastics include vinyls, thermoplastic elastomers, urethanes, or low-density olefins. Also, it is preferable that the durometer hardness of the plastic be about 50 shore D, although other hardnesses may be employed. With respect to the channel members, the stiffener members, and the extension arms, it is preferable that they be made of aluminum so as to conserve weight. Similarly, the angle bars used as a backing plate to the plastic bumper member are preferably made of aluminum.

Another embodiment of the invention is disclosed in FIG. 13, wherein upper and lower bumper units are provided in a single assembly by including back-to-back C-shaped channel members 98 and 99 to which the extension bars of the bumpers are suitably pivotally connected or hinged. The back-to-back C-shaped channel members 98 and 99 therefore provide an upwardly facing channel member 98 and a downwardly facing channel member 99. The upwardly facing channel member hingedly connects extension arms 98a to an upper bumper unit 100, while the lower channel member 99 faces downwardly and includes extension arms 99a for pivotally connecting or hinging the lower bumper unit 101 to the channel member 99. A Z-shaped bracket 104 is suitably connected to the channel members 98 and 99 and includes a flange 105 that may be suitably connected to the movable deck 30. These bumper units will operate between open and closed positions in the same manner as the embodiments of FIGS. 8 to 12 and include clips 106 and 107 for latching the bumpers in closed position. It may be appreciated that other types of retaining means, such as straps utilizing Velcro fasteners and the like, may be provided to maintain the bumper in closed position.

Thus, the Z-shaped bracket 104 facilitates the mounting of the entire assembly to the movable deck. It will be appreciated that the upper and lower bumper units of FIGS. 8 to 12, however, would be generally mounted onto the deck in offset relation from one another and not in completely opposed position as the embodiment of FIG. 13. It will also be appreciated that the bumper units of this embodiment when in open position are at a predetermined position so that upon lowering of the movable deck to the floor, the bumper, when engaging the floor, can fold or close automatically. Similarly, with respect to the upper bumper, when the bumper engages the roof, further upward movement of the upper deck will cause it to close automatically. This feature prevents damaging of the bumpers if they are not first folded to closed and latched position when lowering or raising the deck 30.

It will be understood that modifications and variations may be effected without departing from the scope of the novel concepts of the present invention, but it is understood that this application is to be limited only by the scope of the appended claims.

The invention is hereby claimed as follows:

1. In a trailer for carrying vehicles, wherein the trailer includes a floor, a roof, upstanding side walls between the roof and floor, an end wall between the roof and floor at one end, doors at the other end movable between open and closed positions for loading and unloading vehicles and/or freight, and a deck movable between the floor and roof, the improvement being in a bumper system mounted on at least one of the upper or lower sides of the deck for protecting the vehicle doors from contacting the side walls of the trailer and against damage when the doors are opened, said bumper system comprising:

a bumper having at least a door contacting portion of material that prevents vehicle door damage when contacted, a plurality of extension arms pivotally mounted at one end to the bumper and pivotally mounted at the other end to the deck such that said bumper is movable between open position for engagement by said doors and closed position for storage against the deck, whereby said bumper may be selectively closed to allow the deck to be raised to a position against the roof or lowered to a position against the floor.

2. The bumper system of claim 1, wherein said system further includes means for maintaining the bumper in open position.

3. The bumper system of claim 1, wherein said system further includes means for maintaining the bumper in closed position.

4. The bumper system of claim 2, wherein said system further includes means for selectively maintaining the bumper in closed position.

5. The bumper system of claim 2, wherein said maintaining means comprises springs mounted on the deck for applying forces against said arms.

6. The bumper system of claim 3, wherein said maintaining means comprises latch means mounted on the deck for releasably engaging the bumper.

7. The bumper system of claim 4, wherein said means maintaining said bumper in open position includes springs mounted on the deck for applying forces to said arms, and said means for maintaining said bumper in closed position includes latch means mounted on the deck.

8. The bumper system of claim 1, wherein the bumper system when mounted on the upper side of the deck is structured and mounted to automatically close when the deck is moved to the roof.

9. The bumper system of claim 1, wherein the bumper system when mounted on the lower side of the deck is structured and mounted to automatically close when the deck is moved to the floor.

10. The bumper system of claim 1, wherein the bumper portion contacting the doors is plastic.

11. The bumper system of claim 1, wherein said contacting portion comprises a plastic door contacting portion carried on a base of rigid material that is pivotally connected to the extension arms.

12. The bumper system of claim 10, wherein the bumper portion is urethane plastic.

13. The bumper system of claim 11, wherein the rigid material and extension arms are aluminum.

14. The bumper system of claim 8, wherein the extension arms define an acute angle with the bumper when the bumper is in open position.

15. The bumper system of claim 1, which further includes a channel member mounted on the deck to which the extension arms are pivotally connected and with which the bumper and arms compactly nest when in closed position.

16. In a trailer for carrying vehicles, wherein the trailer includes a floor, a roof, upstanding side walls between the floor and roof, and end wall between the floor and roof at one end, doors at the other end movable between open and closed positions for loading and unloading vehicles and/or freight, and a deck movable between the floor and roof, the improvement being in a bumper system mounted on the deck for protecting vehicle doors of vehicles carried on the deck and the floor from contacting the trailer side walls and against damage when the doors are opened, said bumper system comprising an upper bumper above the deck and a lower bumper below the deck, said bumpers preventing vehicle door contact with the side walls, a plurality of extension arms above the deck and a plurality of extension arms below the deck, each of the extension arms being pivotally connected to the deck at one end, each arm above the deck being pivotally connected at its other end to the upper bumper and each arm below the deck being pivotally connected at its other end of the lower bumper, each of said bumpers being movable between open positions for protecting the doors and closed positions for storage when not in use and when the deck is either lowered to the floor or raised to the roof.

17. The bumper system of claim 16, which further includes spring means and stop means for maintaining the bumpers in predetermined open positions.

18. The bumper system of claim 17, which further includes means for selectively maintaining the bumpers in closed positions.

19. The bumper system of claim 18, whereby the bumpers and respective extension arms are mounted such that the lower bumper will close automatically when the deck is lowered to the floor and the upper bumper will close automatically when the deck is raised to the roof.

20. The bumper system of claim 18, wherein said means for maintaining the bumpers in closed positions includes spring clip means.

21. The bumper system of claim 16, which further includes a channel member mounted on the deck for each bumper to which the extension arms therefor are pivotally connected and with which the bumper and arms therefor compactly nest when in closed position.

22. The bumper system of claim 21, wherein the channel members of the upper and lower bumpers are offset from one another.

23. The bumper system of claim 21, wherein the channel members of the upper and lower bumpers are in back-to-back relation.

24. The bumper system of claim 17, wherein said spring means includes a torsion spring disposed at the deck pivot connection for each extension arm.

25. The bumper system of claim 19, wherein said extension arms in open position form about a 65-degree angle with the deck.

26. The bumper system of claim 16, wherein each said bumper includes a plastic door-contacting rail carried by a stiffening member that is pivotally connected to the extension arms.

* * * * *